United States Patent
Hirasawa et al.

(10) Patent No.: US 12,380,725 B2
(45) Date of Patent: Aug. 5, 2025

(54) SEATING POSITION MANAGEMENT SYSTEM AND SEATING POSITION MANAGEMENT METHOD

(71) Applicant: PANASONIC INTELLECTUAL PROPERTY MANAGEMENT CO., LTD., Osaka (JP)

(72) Inventors: Sonoko Hirasawa, Kanagawa (JP); Takeshi Fujimatsu, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 392 days.

(21) Appl. No.: 17/912,274

(22) PCT Filed: Feb. 11, 2021

(86) PCT No.: PCT/JP2021/005124
§ 371 (c)(1),
(2) Date: Sep. 16, 2022

(87) PCT Pub. No.: WO2021/186967
PCT Pub. Date: Sep. 23, 2021

(65) Prior Publication Data
US 2023/0134665 A1 May 4, 2023

(30) Foreign Application Priority Data
Mar. 19, 2020 (JP) .................................. 2020-049662

(51) Int. Cl.
*G06V 40/10* (2022.01)
*G06Q 10/0631* (2023.01)
(Continued)

(52) U.S. Cl.
CPC .......... *G06V 40/103* (2022.01); *G06V 10/761* (2022.01); *G06V 20/36* (2022.01); *G06Q 10/0631* (2013.01)

(58) Field of Classification Search
CPC .. G06Q 10/06; G06Q 10/0631; G06V 10/761; G06V 20/36
See application file for complete search history.

(56) References Cited

U.S. PATENT DOCUMENTS

2017/0255880 A1\* 9/2017 Daher et al. ........... G06Q 10/02
2021/0089973 A1 3/2021 Hirasawa et al.

FOREIGN PATENT DOCUMENTS

| CN | 103686092 A | \* | 3/2014 | ............... H04N 7/18 |
| JP | 2019-144918 | | 8/2019 | |

(Continued)

OTHER PUBLICATIONS

International Search Report issued in International Pat. Appl. No. PCT/JP2021/005124, dated Apr. 6, 2021, along with an English translation thereof.

*Primary Examiner* — Vu Le
*Assistant Examiner* — Matthew Bodnark
(74) *Attorney, Agent, or Firm* — GREENBLUM & BERNSTEIN, P.L.C.

(57) ABSTRACT

Provided is a system that enables inexpensive and accurate identification of the seating position of each user in a free address office without incurring additional equipment costs. The system identifies a user who has entered an office by performing a face verification operation which involves comparing a face image of an entering person who is entering the office acquired from an image captured by a first entrance camera, with the face image of each registered user for matching, and identifies the seating position of the user in the office by performing a person verification operation which involves comparing a first person image acquired (Continued)

from an image captured by a second entrance camera, with a second person image acquired from an image captured by an in-area camera to thereby associate a person who has entered the office with a corresponding person who is seated in the office.

10 Claims, 14 Drawing Sheets

(51) Int. Cl.
*G06V 10/74* (2022.01)
*G06V 20/00* (2022.01)

(56) References Cited

FOREIGN PATENT DOCUMENTS

| | | | | |
|---|---|---|---|---|
| JP | 3617940 A1 | * | 3/2020 | ............. G08B 21/24 |
| JP | WO2021186569 A1 | * | 9/2021 | ............. G06Q 10/06 |

* cited by examiner

SEATING POSITION MANAGEMENT SYSTEM AND SEATING POSITION MANAGEMENT METHOD

TECHNICAL FIELD

The present invention relates to a seating position management system and a seating position management method for identifying a seating position of a user in an office area.

BACKGROUND ART

In recent years, free address offices, in which users can freely select office seats to work, have been drawing attention from the viewpoint of activating communication between workers and encouraging collaboration across different departments and divisions.

In the case of such a free address office, as a visitor to the office does not know the seating position of a person the visitor wants to meet with, it would take some time for the visitor to locate the person in the office. Known technologies that address this problem include a system for presenting a guidance indicating who is seated at where in the office to a visitor (Patent Document 1).

PRIOR ART DOCUMENT(S)

Patent Document(s)

Patent Document 1: JP2019-144918A

SUMMARY OF THE INVENTION

Task to be Accomplished by the Invention

Some systems of the prior art are configured to identify the seating position of each user after the user has entered a free address area. Such a system requires a feature for identifying a seated user. Examples of a method for implementing such a feature for identification include installing a tag detector at each seat to detect a wireless tag carried by a seated user, installing a camera at each seat to capture an image of the face of a seated user, installing a card reader at each seat to read an IC card carried by a seated user, or providing a seat map screen to which a user can enter the user's seating position. Thus, those systems of the prior art have a problem of relatively high additional equipment costs and maintenance costs incurred for identifying the seating position of each person in the office.

Some systems of the prior art are configured to identify a person using person authentication at the entrance of an office and then track the movement of the person, so as to identify the seating position of the user. However, a problem is that such a tracking operation tends to fail since it is difficult to track a person's movement from an entrance to a seating position without interruption, and, in some cases, such a system requires the installation of a number of cameras to achieve uninterrupted tracking of the person's movement.

The present invention has been made in view of such problems of the prior art, and a primary object of the present invention is to provide a seating position management system and a seating position management method which enable inexpensive and accurate identification of the seating position of each user in a free address office without incurring additional equipment costs.

Means to Accomplish the Task

An aspect of the present invention provides a seating position management system in which a processing controller performs operations for identifying a seating position of a user in an office area, the system comprising: an entrance camera for capturing images of an area in and around an entrance to the office area; and an in-area camera for capturing images of an area within the office area; wherein the processing controller is configured to: identify a user who has entered the office area by performing a person identification operation on an entering person who is entering the office area; and identify the seating position of the user in the office area by performing a person verification operation based on a first person image acquired from an image captured by the entrance camera and a second person image acquired from an image captured by the in-area camera, wherein the person verification operation involves comparing the first person image with the second person image for matching to thereby associate an entered person who has entered the office area with a seated person who is seated in the office area.

Another aspect of the present invention provides a seating position management method in which a processing controller performs operations for identifying a seating position of a user in an office area, wherein the processing controller identifies a user who has entered the office area by performing a person identification operation on an entering person who is entering the office area; and the processing controller identifies the seating position of the user in the office area by performing a person verification operation based on a first person image acquired from an image captured by the entrance camera and a second person image acquired from an image captured by the in-area camera, wherein the person verification operation involves comparing the first person image with the second person image for matching to thereby associate an entered person who has entered the office area with a seated person who is seated in the office area.

Effect of the Invention

According to the present invention, a seated user can be identified, without a need for the installation of any device for identifying a seated person at each seat or a need for the tracking of a person's movement, which further eliminates a need for the installation of a number of cameras for tracking a person's movement. As a result, it is possible to achieve inexpensive and accurate identification of the seating position of each user in a free address office without incurring additional equipment costs.

DESCRIPTION OF THE PREFERRED EMBODIMENT(S)

Figure 1:
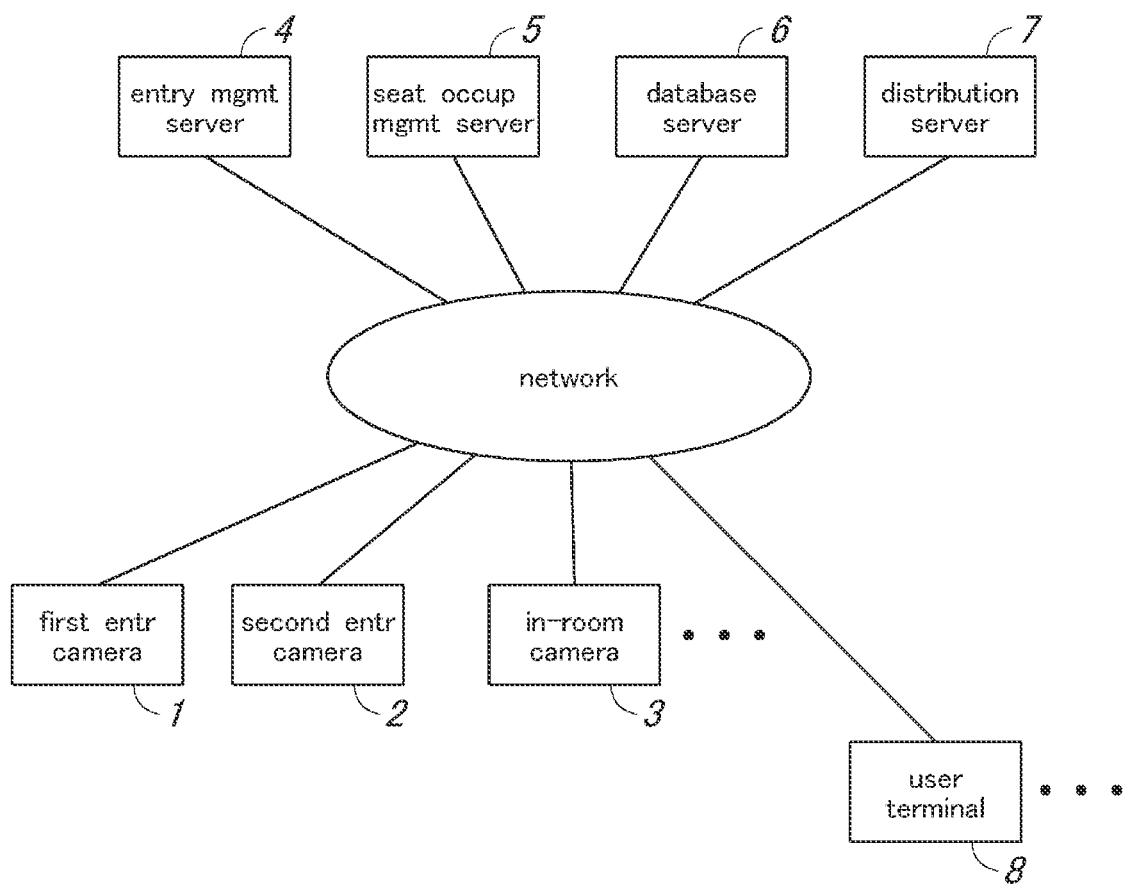
FIG. 1 is a diagram showing an overall configuration of a seating position management system according to a first embodiment of the present invention.

A first aspect of the present invention made to achieve the above-described object is a seating position management system in which a processing controller performs operations for identifying a seating position of a user in an office area, the system comprising: an entrance camera for capturing images of an area in and around an entrance to the office area; and an in-area camera for capturing images of an area within the office area; wherein the processing controller is configured to: identify a user who has entered the office area by performing a person identification operation on an entering person who is entering the office area; and identify the seating position of the user in the office area by performing a person verification operation based on a first person image acquired from an image captured by the entrance camera and a second person image acquired from an image captured by the in-area camera, wherein the person verification operation involves comparing the first person image with the second person image for matching to thereby associate an entered person who has entered the office area with a seated person who is seated in the office area.

In this configuration, a seated user can be identified, without a need for the installation of any device for identifying a seated person at each seat or a need for the tracking of a person's movement, which further eliminates a need for the installation of a number of cameras for tracking a person's movement. As a result, it is possible to achieve inexpensive and accurate identification of the seating position of each user in a free address office without incurring additional equipment costs.

A second aspect of the present invention is the seating position management system of the first aspect, wherein the processing controller performs the person identification operation through face verification by comparing a face image of the entering person acquired from an image captured by the entrance camera with the face image of each registered user for matching.

In this configuration, the system can perform the person identification operation in an easy and accurate manner, without troubling a user.

A third aspect of the present invention is the seating position management system of the first aspect, wherein the processing controller performs the person verification operation when detecting that a user takes a seat in the office area, using the second person image captured immediately before the detection.

In this configuration, the system can perform the person identification operation with proper timing.

A fourth aspect of the present invention is the seating position management system of the first aspect, wherein the processing controller performs the person verification operation by comparing feature data extracted from the first person image with feature data extracted from the second person image for matching.

In this configuration, the system can perform the person identification operation in an accurate manner. In this case, feature data extracted from the first and second person images may feature data related to the appearance of a person (such as color of clothes) and/or the body frame of the person.

A fifth aspect of the present invention is the seating position management system of the first aspect, wherein the processing controller determines whether occupancy status of a seat in a seat occupancy detection area is occupied or vacant based on the image captured by the in-area camera, and determines whether a user takes a seat or leaves the seat based on a result of the detection of occupancy status of the seat.

In this configuration, the system can determine whether a user takes a seat or leaves in an accurate manner.

A sixth aspect of the present invention is the seating position management system of the first aspect, wherein, when there is an entered person who has entered the office area and whose seating position has not been identified, the processing controller transmits a notification to a user device carried by the entered person to prompt the entered person to register the person's seating position.

In this configuration, the system can identify the seating position of a person whose seating position has not been known, by having the person register the seating position.

A seventh aspect of the present invention is the seating position management system of the first aspect, wherein, when there is a seated person on a seat which should be a vacant seat, the processing controller transmits a notification to a user device carried by the seated person to prompt the seated person to do face verification using a camera located near the seated person.

In this configuration, the system can identify a seated person who has not been identified, by having the person do face verification.

An eighth aspect of the present invention is the seating position management system of the first aspect, wherein the processing controller generates a screen in which a mark image indicating the seating position for a user is overlaid on an area map indicating a layout plan of the office area, and displays the generated screen on a user device carried by the user.

In this configuration, the system enables a user to quickly recognize the occupancy status of a seat in the office.

A ninth aspect of the present invention is the seating position management system of the first aspect, wherein the processing controller detects belongings of a user located in and around a seat occupancy detection area and determines whether a seat in the seat occupancy detection area is occupied or vacant based on a detection result.

In this configuration, even in the case where a user temporarily leaves a seat for some reason (e.g., for a meeting with another person in the office), when there are belongings of the user located in and around the seat, the occupancy status of the user's seat is not changed to vacant (i.e., a vacant seat). As a result, the system can provide correct information to a user who needs to recognize the occupancy status of a seat in the office area.

A tenth aspect of the present invention is a seating position management method in which a processing controller performs operations for identifying a seating position of a user in an office area, wherein the processing controller identifies a user who has entered the office area by performing a person identification operation on an entering person who is entering the office area; and the processing controller identifies the seating position of the user in the office area by performing a person verification operation based on a first person image acquired from an image captured by the entrance camera and a second person image acquired from an image captured by the in-area camera, wherein the person verification operation involves comparing the first person image with the second person image for matching to thereby associate an entered person who has entered the office area with a seated person who is seated in the office area.

In this configuration, it is possible to achieve inexpensive and accurate identification of the seating position of each user in a free address office without incurring additional equipment costs, in the same manner as the first aspect.

Embodiments of the present invention will be described below with reference to the drawings.

First Embodiment

FIG. 1 is a diagram showing an overall configuration of a seating position management system according to a first embodiment of the present invention.

This seating position management system is configured to identify and manage each person who takes a corresponding office seat in a free address office room (office area). (Hereafter, the terms "office seat" and "office room" are also referred as simply "seat" and "office", respectively.) This seating position management system includes a first entrance camera 1 for face verification, a second entrance camera 2 for person verification, an in-room camera(s) 3 (in-area camera) for seating detection and person verification, an entry management server 4, a seat occupancy management server 5, a database server 6, a distribution server 7, a user terminal 8 (user device).

The first entrance camera 1 is installed at or near an entrance of the office and configured to capture an image of the face of a person who needs to undergo face verification (face authentication). The first entrance camera 1 is typically a box camera configured to capture a predetermined range of angles of view.

The second entrance camera 2 is installed at or near the entrance of the office and configured to capture an image of a person who is entering the office (entering person) through the entrance. The second entrance camera 2 is typically an omnidirectional camera having a fisheye lens and configured to capture a 360-degree angle of view.

The in-room camera 3 is installed in the office and configured to capture an image of a person who has entered in the office (entered person). The in-room camera 3 is typically an omnidirectional camera having a fisheye lens and configured to capture a 360-degree angle of view. The in-room camera 3 may be a box camera configured to capture a predetermined range of angles of view. In other cases, the in-room camera 3 may be a simple camera (such as a USB camera) connected to a personal computer in the office.

The entry management server 4 is configured to identify and/or manage an entering person who is entering the office based on an image captured by the first entrance camera 1 and an image captured by the second entrance camera 2.

The seat occupancy management server 5 is configured to identify and/or manage a person who is seated at a seat in the office (seated person) based on an image captured by the in-room camera 3.

The database server 6 is configured to store management information processed by each of the entry management server 4 and the seat occupancy management server 5.

The distribution server 7 distributes information on the seating position of each user in the office to at least one user terminal 8 based on the management information stored in the database server 6.

The user terminal 8 presents information on the seating position of each user in the office to a user, based on the information distributed from the distribution server 7.

Figure 2:
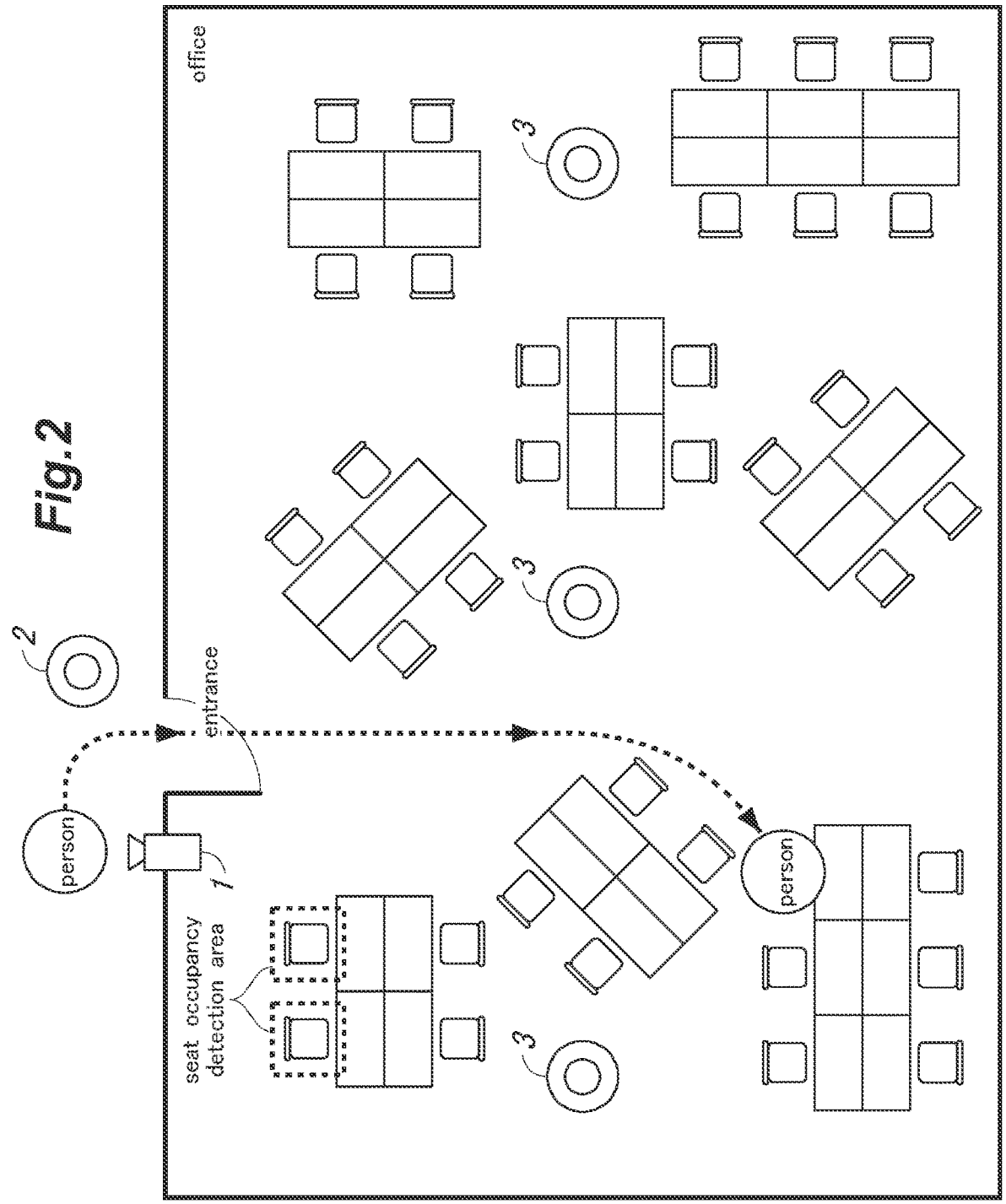
FIG. 2 is an explanatory diagram showing a layout plan of an office, an arrangement of cameras 1, 2, and 3, and seat occupancy detection areas set in the office.

Next, one implementation of the system, including a layout plan of an office, an arrangement of cameras 1, 2, and 3, and seat occupancy detection areas set in the office will be described. FIG. 2 is an explanatory diagram showing a layout plan of an office, an arrangement of cameras 1, 2, and 3, and seat occupancy detection areas set in the office.

A first entrance camera 1 and a second entrance camera 2 are installed at the entrance of the office. The first entrance camera 1 captures an image of the face of a person entering the office. The second entrance camera 2 captures an image of the whole body or upper body of a person entering the office.

In the example shown in FIG. 2, the second entrance camera 2 is installed outside the office. However, the second entrance camera 2 may be installed within the office, so that the second entrance camera 2 can capture the face of a person who has just entered the office through the entrance.

Desks and seats (office chairs) are arranged in some groups such that desks and seats of each group are located side by side in the office. A user can find a vacant seat and take the seat.

In-room cameras 3 are provided on the ceiling of the office so that the in-room cameras can capture images of persons in the office.

In the present embodiment, seat occupancy detection areas are preset for the respective seats on the captured images of the in-room cameras 3, and the system detects whether or not a person is seated on each seat in the office based on images of the preset seat occupancy detection areas. In the example shown in FIG. 2, a seat occupancy detection area (area surrounded by dotted lines) has a rectangular shape in a plan view of the office. However, in practice, each seat occupancy detection area is set as a polygon-shaped area on omnidirectional images (fisheye images) captured by the in-room cameras 3.

Each seat occupancy detection area is set at a position where the body of a person is likely to be present, based on the size of a person's body so that each detection area is positioned at where a corresponding person is seated. In a preferred embodiment, a user operates on a screen that displays images captured by the in-room cameras 3, thereby designating an area covered by each detection area. In other embodiments, the system may detect objects (seats and desks) in images captured by the in-room cameras 3 to determine an area covered by each detection area based on the detection result.

Figure 3:
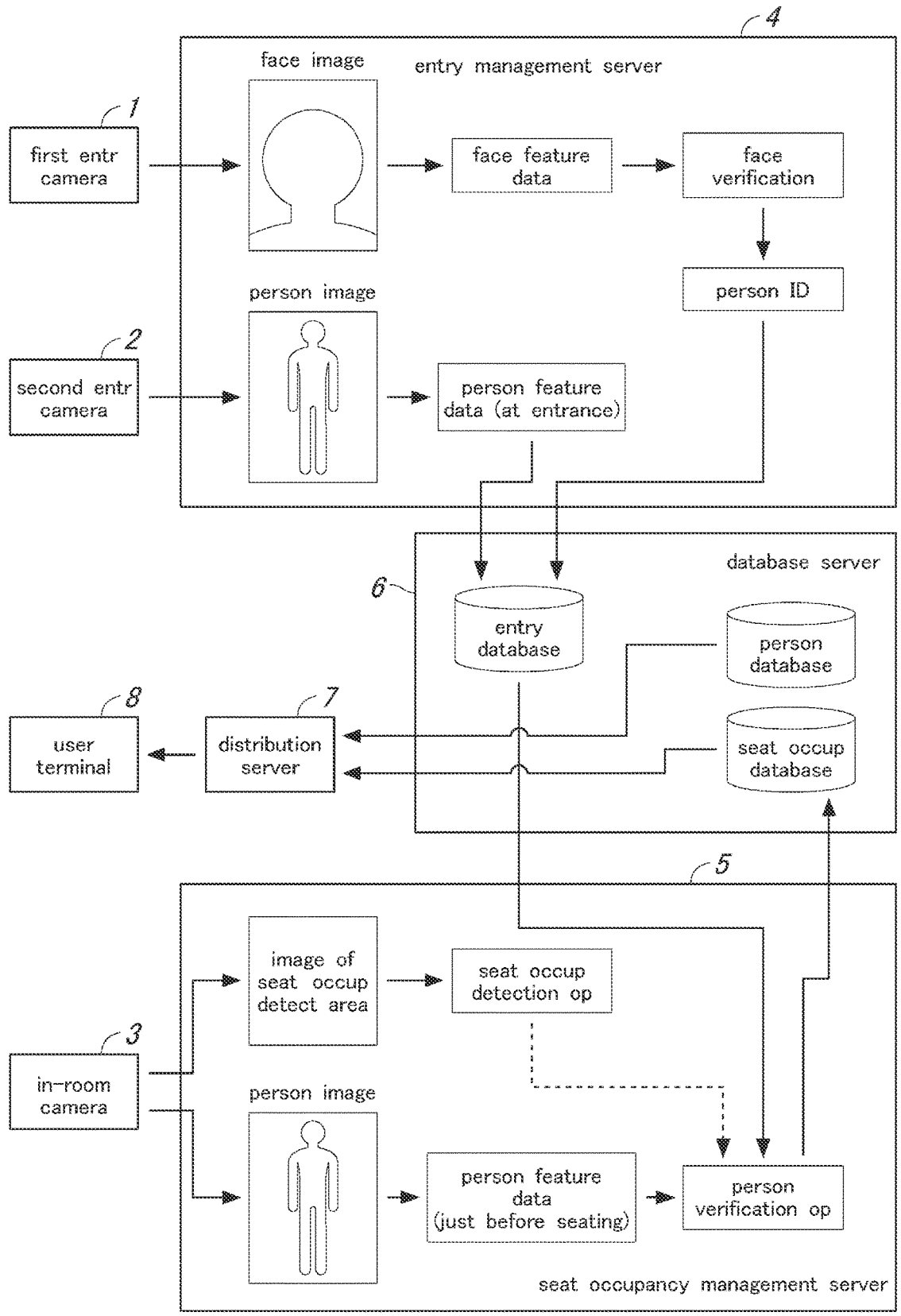
FIG. 3 is an explanatory diagram showing an outline of processing operations performed by the seating position management system.

Next, an outline of processing operations performed by the seating position management system will be described. FIG. 3 is an explanatory diagram showing an outline of processing operations performed by the seating position management system.

The entry management server 4 cuts out an image area of a person's face from an image captured by the first entrance camera 1 to acquire a face image, and extracts, from the face image, face feature data of an entering person who is entering the office. Then, the entry management server 4 compares the face feature data of each registered person with the face feature data of the entering person, and identifies the entering person (face verification operation). By performing this face verification operation, the entry management server 4 associates each entering person with a corresponding registered person to thereby identify the entering person. The entry management server 4 registers the person ID of the identified entering person in an entry database present in the database server 6. When face verification (face authentication) is successful for a user, the user can enter the office. In the present embodiment, face authentication is performed as a person identification operation. However, the person identification operation may be performed though card authentication or biometrics authentication as described later with reference to a second embodiment.

When face verification is successful for an entering person who is entering the office, the entry management server 4 cuts out an image area of the whole body or upper body of the entering person from an image captured by the second entrance camera 2 at the same time as the face verification operation, acquires a person image (first person image), and extract, from the person image, person feature data of the entering person (person detection operation). The entry management server 4 registers the person feature data of the entering person in the entry database present in the database server 6.

Person feature data represents appearance features of the whole body or upper body of a person, such as the color of the person's clothes, the item(s) carried by the person, and the body frame of the person.

The seat occupancy management server 5 cuts out an image area of a seat occupancy detection area (seat) from an image captured by an in-room camera 3 to acquire a seat occupancy detection area image, determines whether or not a person is present in the seat occupancy detection area from the seat occupancy detection area image, and, based on a result of the person presence determination, determiners whether the occupancy status of a seat is occupied or vacant in the seat occupancy detection area. The seat occupancy management server 5 periodically carries out the seat occupancy detection operation.

Furthermore, when the occupancy status of the seat is changed from vacant to occupied; that is, when a person is seated, the seat occupancy management server 5 cuts out an image area of the whole body or upper body of a person from an image which was captured by an in-room camera 3 immediately before the person takes the seat, to thereby acquire a person image (second person image), and, from the person image, extracts person feature data of the person immediately before taking the seat. Then, the seat occupancy management server 5 compares the person feature data of the person immediately before taking the seat with person feature data of each entered person who is registered in the entry database in the database server 6 for matching (person verification operation). By performing the person verification operation, the seat occupancy management server 5 associates the person who is taking the seat with a corresponding entered person who is registered in the entry database to thereby identify the person who is taking the seat.

When a user is seated on a seat, the user's body is partially hidden by the desk or chair, which can prevent from extraction of proper person feature data. Thus, in the present embodiment, the seat occupancy management server 5 acquires a person image from an image captured when a user was still standing immediately before taking a seat, and extracts person feature data from that person image.

The distribution server 7 generates seating position information on the seating position of each user in the office based on information records registered in a seat occupancy database and a person database in the database server 6, respectively, and distributes the seating position information to a user terminal 8.

In the present embodiment, the system is provided with four separate processing devices, which are the entry management server 4, seat occupancy management server 5, database server 6, and distribution server 7. However, the present invention is not limited to such a configuration, and may be configured to include a single processing device which implements all the servers; that is, the entry management server 4, seat occupancy management server 5, database server 6, and distribution server 7.

In the present embodiment, the system is provided with the first entrance camera 1 for face verification and the second entrance camera 2 for person verification. However, the system may be configured to include a single camera (e.g., an omnidirectional camera) that can be used for both face verification and person verification. When an omnidirectional image captured by an omnidirectional camera is used to acquire a face image for face verification, the system may be configured to convert an omnidirectional image to a panoramic image, and then cut out an image area of the face of a person from the panoramic image.

Figure 4:
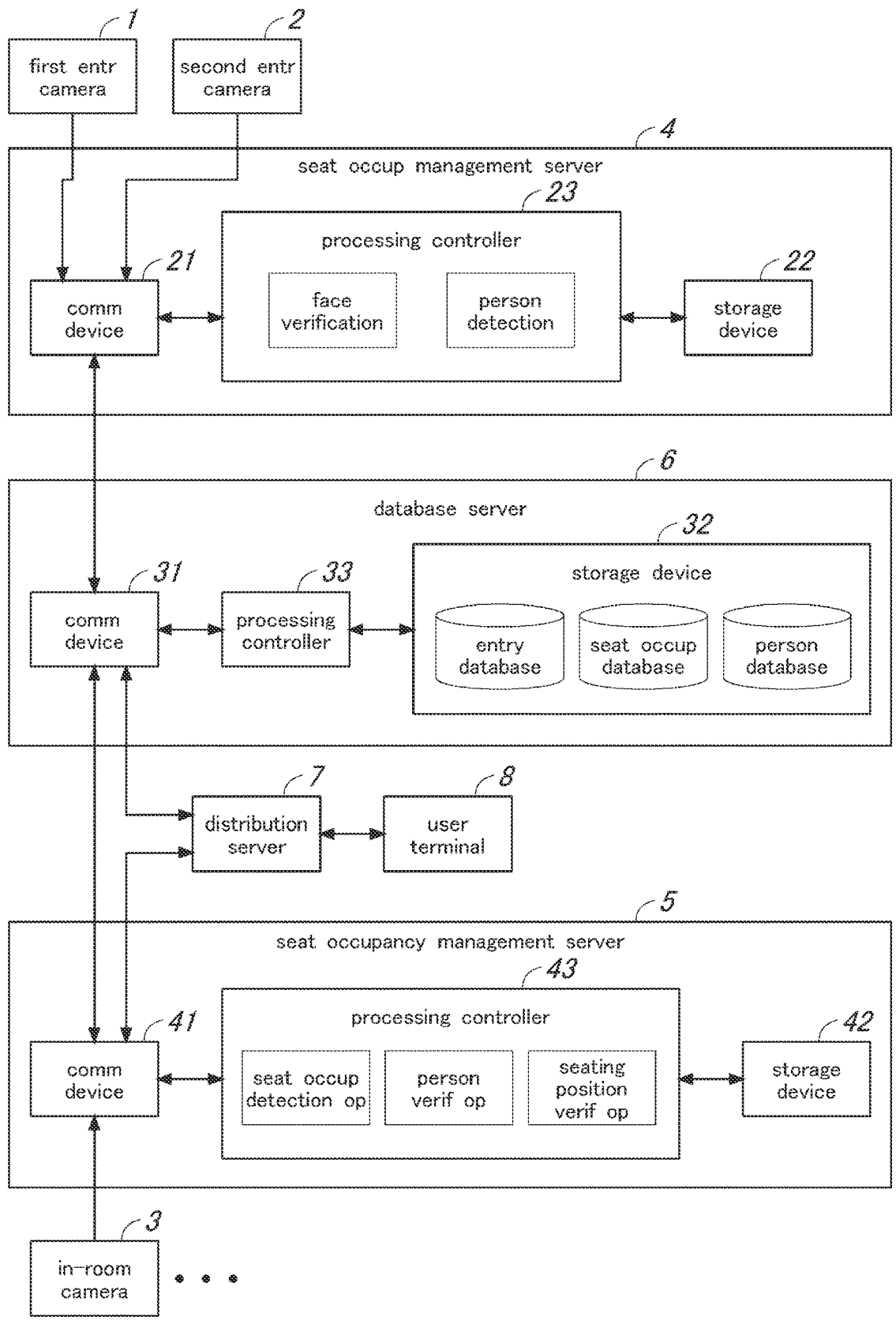
FIG. 4 is a block diagram showing schematic configurations of an entry management server 4, a seat occupancy management server 5, and a database server 6.
Figure 5:
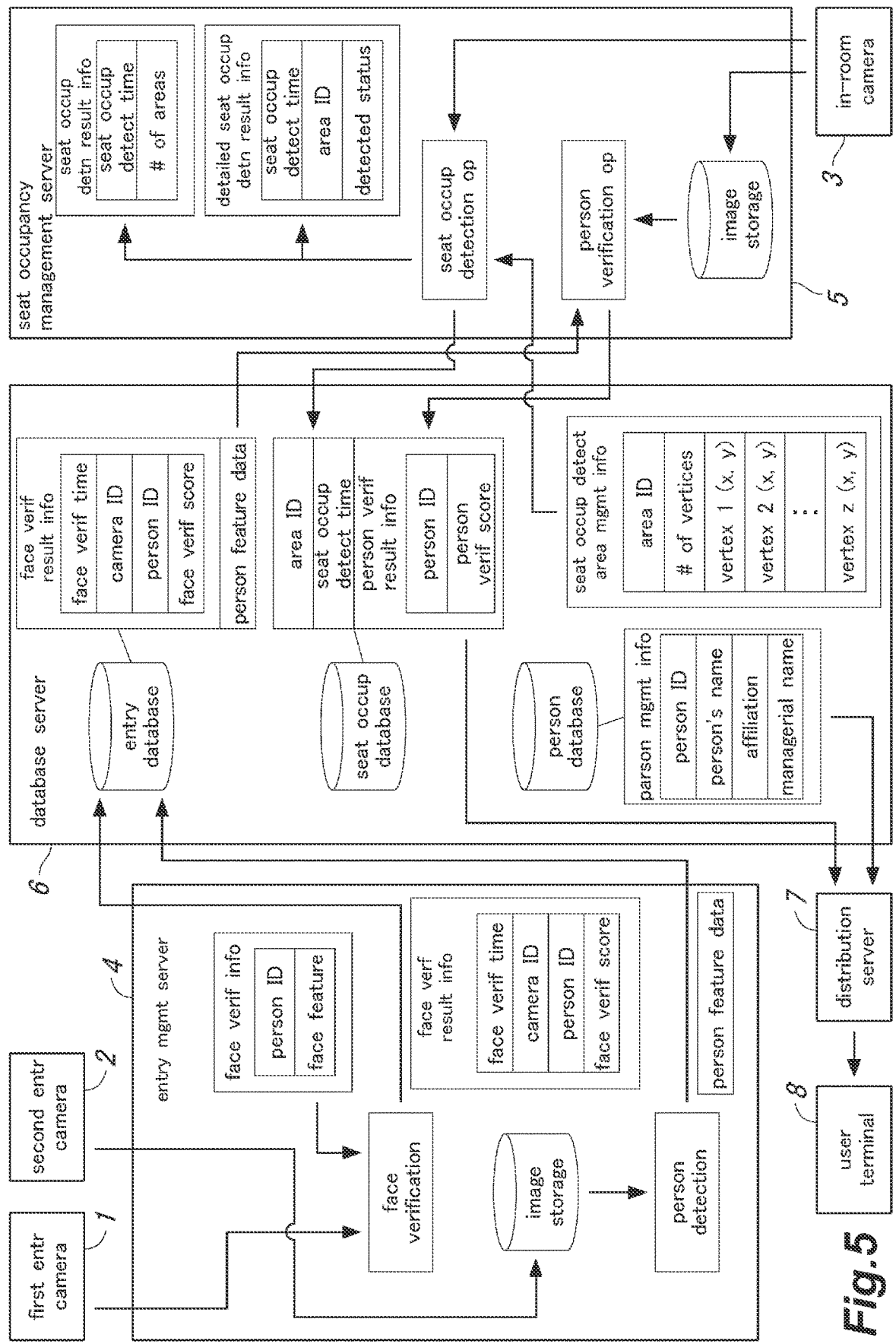
FIG. 5 is an explanatory diagram showing management information processed by the entry management server 4, the seat occupancy management server 5, and the database server 6.

Next, schematic configurations of an entry management server 4, a seat occupancy management server 5, and a database server 6 will be described. FIG. 4 is a block diagram showing schematic configurations of the entry management server 4, the seat occupancy management server 5, and the database server 6. FIG. 5 is an explanatory diagram showing management information processed by the entry management server 4, the seat occupancy management server 5, and the database server 6;

The entry management server 4 includes a communication device 21, a storage device 22, and a processing controller 23.

The communication device 21 is configured to communicate with the database server 6 via a network. The communication device 21 also communicates with the first entrance camera 1 and the second entrance camera 2, and receives captured images from the first entrance camera 1 and the second entrance camera 2.

The storage device 22 stores programs to be executed by the processing controller 23 and other data. Furthermore, the storage device 22 stores face verification information for each user previously registered, specifically, information records such as a person ID and face feature data of each user. The storage device 22 temporarily stores an image captured by the second entrance camera 2.

The processing controller 23 performs various processing operations related to entry management by executing programs stored in the storage device 22. In the present embodiment, the processing controller 23 performs face verification operation, person detection operation, and other operations.

In the face verification operation (face authentication operation), the processing controller 23 cuts out an image area of the face of an entering person who is entering the office from an image captured by the first entrance camera 1 to acquire a face image, and extracts face feature data of the entering person from the face image. Then, the processing controller 23 acquires face feature data for each registered person from the storage device 22, and compares the face feature data for each registered person with the face feature data of the entering person for matching, to thereby identify the entering person.

In the person detection operation, the processing controller 23 detects a person from an image captured by the second entrance camera 2, cuts out an image area of the whole body or upper body of the person from the image captured by the second entrance camera 2 to acquire a person image, and extracts person feature data of the entering person who is entering the office from the person image. The processing controller 23 registers the person feature data of the entering person in the entry database in the database server 6. In this case, the processing controller 23 can cut out a person image directly from an image (omnidirectional image) captured by the second entrance camera 2 (omnidirectional camera). In other cases, the processing controller 23 may convert the captured image into a panoramic image and cut out a person image from the captured image (panoramic image).

The processing controller 23 registers face verification result information (information acquired in the face verification operation) in association with person feature data (data acquired in the person detection operation) in the entry database of database server 6. In order to avoid performing the face verification operation and the person detection operation on different persons, the processing controller 23 preferably performs the person detection operation using an image captured at the same time as or immediately after capturing an image for face verification. This configuration enables extraction of person feature data of a person from a person image captured during or immediately after the face verification operation for the person.

The database server 6 includes a communication device 31, a storage device 32, and a processing controller 33.

The communication device 31 is configured to communicate with the database server 6 via a network.

The storage device 32 stores programs to be executed by the processing controller 33 and other data. Furthermore, the storage device 32 stores registered information records for the entry database, the seat occupancy database, and the person database. The entry database contains information records such as face verification result information (such as a face verification time, a camera ID, a person ID, and a face verification score for each result), and person feature data. The seat occupancy database contains registered information records including an area ID, a seat occupancy detection time, and person verification result information (such as person ID and person verification score). The person database contains registered information records including person management information (such as a person ID, and person's name, affiliation, and managerial name for each person). Furthermore, the storage device 32 contains registered information records including information for seat occupancy detection area management (such as an area ID of each seat occupancy detection area, the number of vertices and the coordinates of each vertex of the polygon representing the seat occupancy detection area).

The processing controller 33 performs various processing operations related to data management by executing programs stored in the storage device 32. Information records stored in the database server 6 are deleted in a certain period.

The seat occupancy management server 5 includes a communication device 41, a storage device 42, and a processing controller 43.

The communication device 41 is configured to communicate with the database server 6 via a network. The communication device 41 also communicates with the in-room cameras 3, and receives captured images from the in-room cameras 3.

The storage device 42 stores programs to be executed by the processing controller 43 and other data. Furthermore, the storage device 22 temporarily stores images captured by the in-room cameras 3.

The processing controller 43 performs various processing operations related to seat occupancy management by executing programs stored in the storage device 42. In the present embodiment, the processing controller 43 performs seat an occupancy detection operation, a person verification operation, a seating position verification operation, and other operations.

In the seat occupancy detection operation, the processing controller 43 detects a person in the image area of a seat occupancy detection area in an image captured by an in-room camera 3, and determines whether or not a person is present in the target seat occupancy detection area. When a person is present in the seat occupancy detection area, the processing controller 43 determines the occupancy status of the seat occupancy detection area to be occupied (occupied status). When there is no person in the seat occupancy detection area, the processing controller 43 determines the occupancy status of the seat occupancy detection area to be vacant (vacant status). Then, the processing controller 43 stores seat occupancy detection result information (seat occupancy detection times, and number of areas) and detailed seat occupancy detection result information (a seat occupancy detection time, the area ID, the detected status for each area) in the storage device 42.

In the person verification operation, when the occupancy status of a seat occupancy detection area is detected in the seat occupancy detection operation and the detected occupancy status has changed from vacant to occupied; that is, when a person is seated, the processing controller 43 cuts out the whole body of the person from an image captured by an in-room camera immediately before the person takes the seat, to thereby acquire a person image, and, from the person image, extracts person feature data of the person immediately before taking the seat (person verification operation). By performing this person verification operation, the processing controller 43 associates the person who is taking the seat with a corresponding entered person who is registered in the entry database to thereby identify the person who is taking the seat.

When acquiring a person image immediately before a person takes a seat, the processing controller 43 acquires an image which was captured by an in-room camera 3 a predetermined number of frames before the moment when detecting the seated person, and acquires a person image from the captured image. When the in-room camera 3 is an omnidirectional camera, the processing controller 43 may convert the captured image to a panoramic image and acquire a person image from the panoramic image. When extracting person feature data of a person from an image captured immediately before the person takes a seat, the processing controller 43 may be configured to select, among persons detected from an image captured by an in-room camera 3, a person located near the seat where the seating is detected, and extracts person feature data of the selected person.

In the seating position verification operation, the processing controller 43 determines whether or not there is a person whose seating position has not been identified; that is, a person who is not seated after a predetermined time has passed since the person entered the office, based on information records stored in the entry database and the seat occupancy database. When there is an entered person whose seating position has not been identified, the processing controller 43 transmits a notification to a corresponding user terminal 8 in order to prompt the entered person to register the seating position by operating the user terminal.

For example, the processing controller 43 may transmit an e-mail to a user terminal 8 to prompt a corresponding user to register the seating position by operating the terminal, and causes the user terminal 8 to display seating position confirmation screen (see FIG. 7) on which the user can enter the user's person information. As a result, the processing controller 43 can identify the person who is taking the seat, and resister the user's information in the seat occupancy database.

In the seating position verification operation, the processing controller 43 determines whether or not there is a seat occupancy detection area which is in the vacant status; that is, whether or not there is a person seated on a seat where the person should not be seated, based on registered information records in the seat occupancy database and the detailed seat occupancy detection result information. When there is a person who is seated on a seat where the person should not be seated, the processing controller 43 transmits a notification to a corresponding user terminal 8 in order to prompt the person to do face verification using a camera located near the person.

Specifically, the processing controller 43 causes the user terminal 8 to display an alert indication 58 in the seating position confirmation screen (see FIG. 8), thereby prompting the user to register the seating position by doing face verification again. The processing controller 43 also provides guidance to notify that the user should turn the face to one of the in-room cameras 3 located nearby. As a result, the processing controller 43 can acquire a face image of the user who is seated, and compares face feature data of the person who is taking the seat extracted from the face image, with registered face feature data of each person registered in the seat occupancy database for matching, to thereby identify the user who is taking the seat and register the person information in the seat occupancy database.

In the present embodiment, the processing controller 43 transmits a notification to a user terminal 8 via the distribution server 7. However, in other embodiments, the seat occupancy management server 5 may directly transmit a notification to a user terminal 8.

Figure 6:
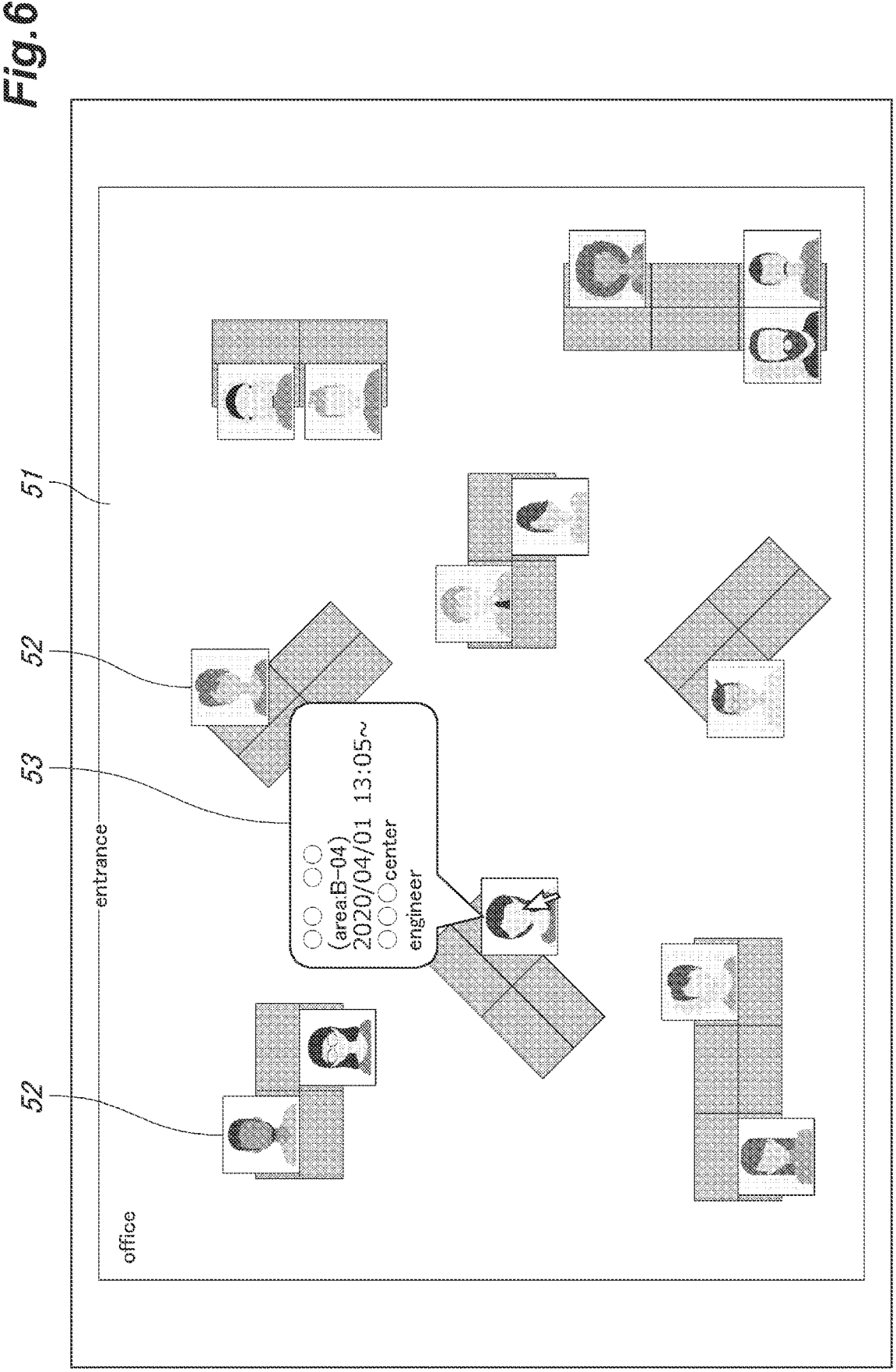
FIG. 6 is an explanatory diagram showing a seating position confirmation screen displayed on a user terminal 8.

Next, a seating position confirmation screen displayed on a user terminal 8 will be described. FIG. 6 is an explanatory diagram showing a seating position confirmation screen displayed on a user terminal 8.

The distribution server 7 generates a seating position confirmation screen that presents a person seated in each seat in the office based on information records registered in the database server 6, and distributes the screen information to a user terminal 8. The seating position confirmation screen is displayed on the user terminal 8.

This seating position confirmation screen includes a layout plan 51 (area map) of the office in which each seat is shown, and the layout plan also indicates person icons 52 at the respective positions of seats (i.e., at the seating positions of users), each person icon representing a person to be seated on a corresponding seat. A person icon 52 includes a face image of a person. Alternatively, a person icon 52 may include a portrait of the person and/or texts representing the name of the person.

When a user operates a person icon 52, a balloon 53 (person information indicator) appears on the screen. The balloon 53 includes detailed information about a corresponding person. The balloon 53 may indicate the name of a person, the ID of a corresponding seat occupancy detection area (seat), a seating start time (seating time), the affiliation and title of the person, and other data.

Figure 7:
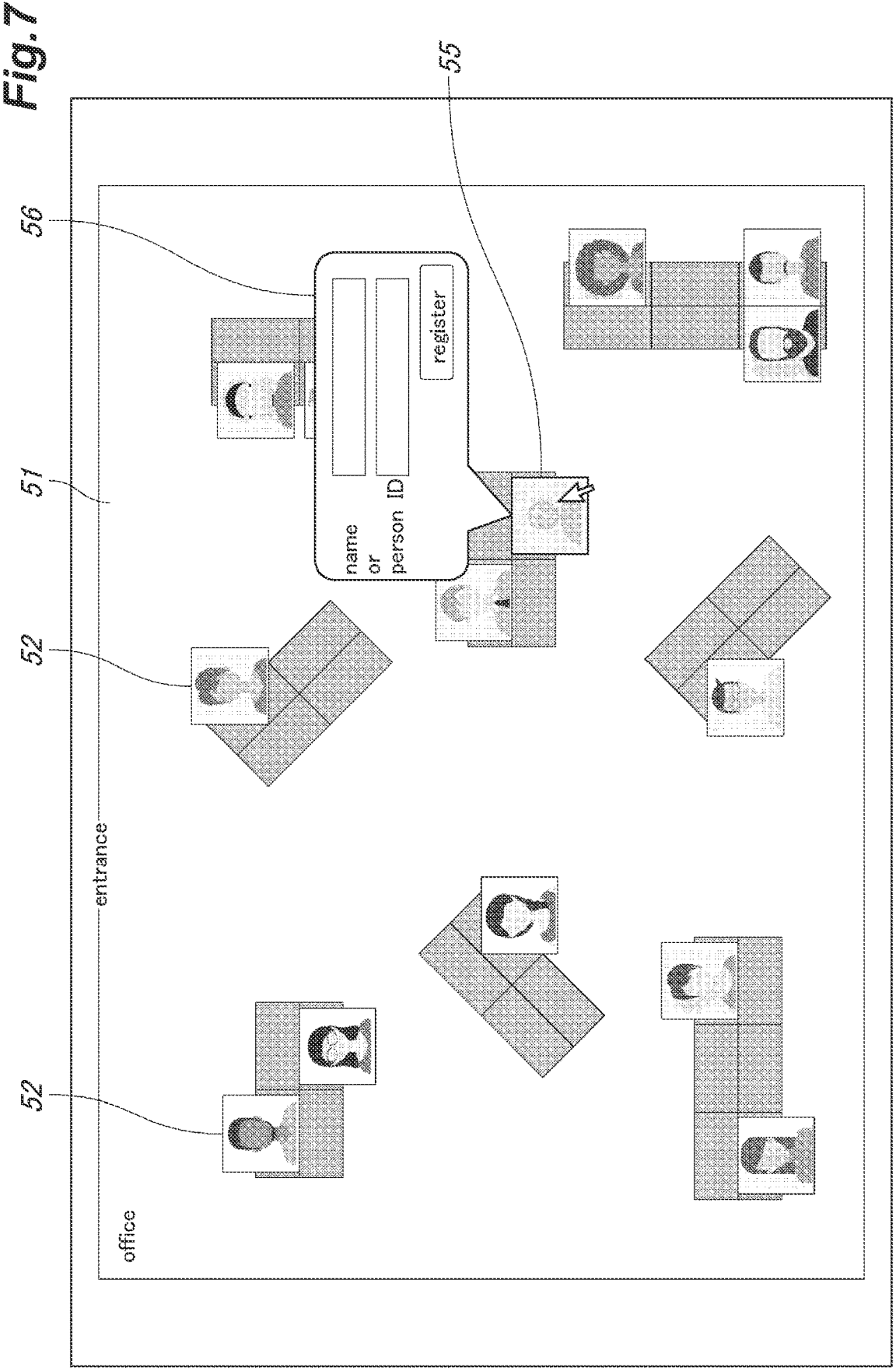
FIG. 7 is an explanatory diagram showing a seating position confirmation screen displayed on the user terminal 8 for registration of the seating position.

Next, a seating position confirmation screen displayed on the user terminal 8 for registration of the seating position will be described. FIG. 7 is an explanatory diagram showing a seating position confirmation screen displayed on the user terminal 8 for registration of the seating position.

In response to detection of the seating of a person, the seat occupancy management server 5 performs the person verification operation. However, when the person verification operation results in failure, the seat occupancy management server 5 cannot identify the person seated on a seat; that is, the person seated on the seat is unidentified. In such case, the unidentified person seated on the seat should be included in those who have undergone face verification.

In the present embodiment, when there is a person who has entered the office after face verification but whose seating is not detected after a predetermined time has passed since the person entered the office, the seat occupancy management server 5 prompts the person to register the seating position of the person by providing a request to the person by email or other communication means. Specifically, the seat occupancy management server 5 causes the person's user terminal 8 to display the seating position confirmation screen to prompt the person to register the seating position by operating the user terminal.

The seating position confirmation screen shown in FIG. 7 includes an unidentified person icon 55 representing an unidentified person seated on a seat. When a user operates the unidentified person icon 55, a balloon 56 (person information entry fields) appears for user's entry of person information. The balloon 56 includes entry fields for user's name and person ID. Then, the user can register themselves as a person seated in the office by entering either the name or person ID of the user and operating the registration button in the balloon.

Figure 8:
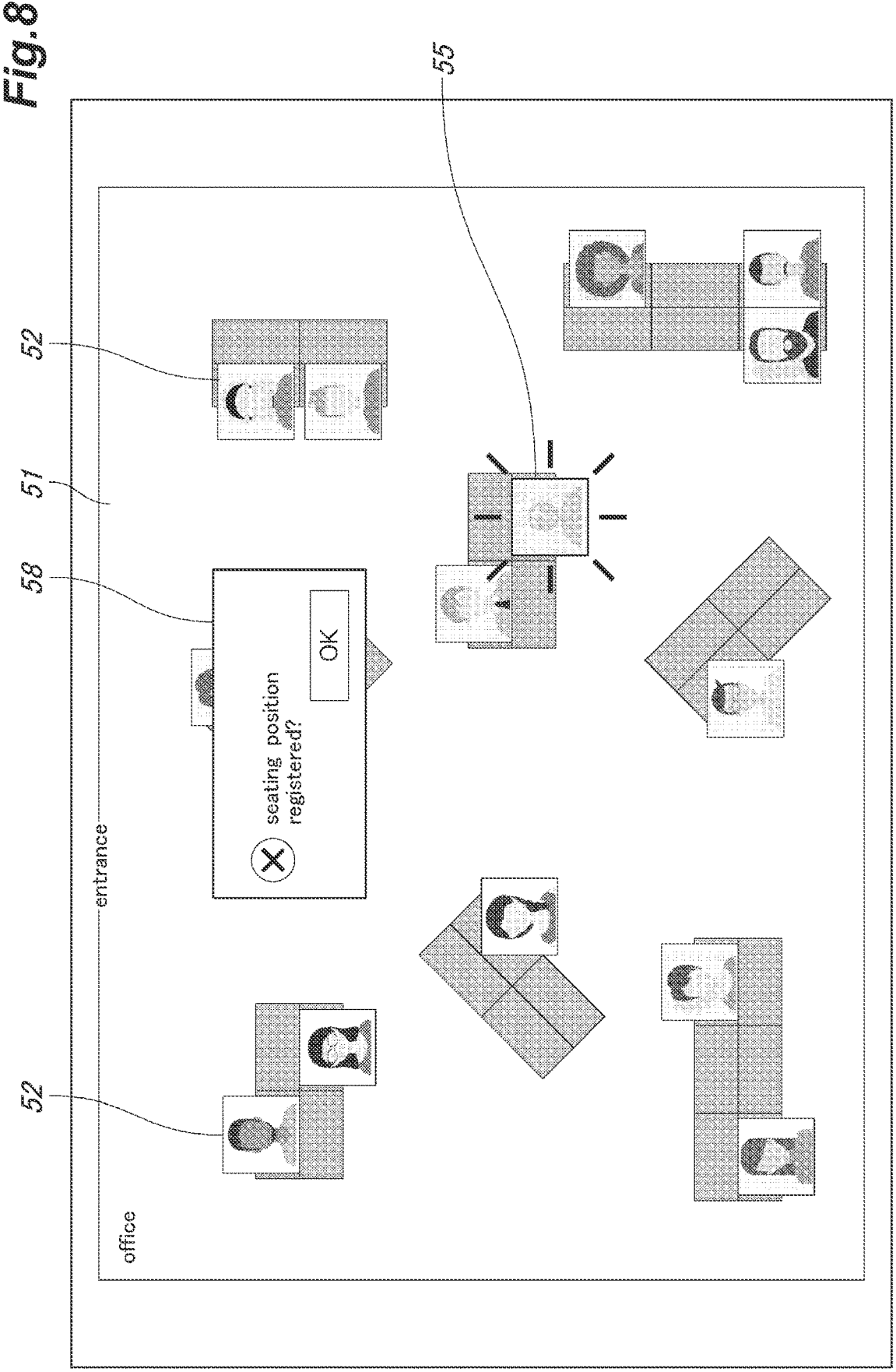
FIG. 8 is an explanatory diagram showing a seating position confirmation screen displayed on the user terminal 8 at the time of alert issuance.

Next, a seating position confirmation screen displayed on the user terminal 8 at the time of alert issuance will be described. FIG. 8 is an explanatory diagram showing a seating position confirmation screen displayed on the user terminal 8 at the time of alert issuance.

A person may temporarily leave a seat for some reason such as for a meeting with another person in the office. In this case, the seat becomes a vacant seat, but when the person returns to the seat within a limited period; that is, before a predetermined limit time has passed since the person leaves the seat, the seat occupancy management server 5 determines that the occupancy status of the seat remains occupied. However, when the person does not return to the seat within the limited period, the seat occupancy management server 5 determines that the person has left the seat; that is, the occupancy status of the seat has changed to vacant. In this case, when the person returns to the seat after the limited period has expired, the seat occupancy management server 5 detects the seating of the person but cannot identify the person. This is because person information for that person has been deleted from the seat occupancy database when the person was determined to have left the seat and the person does not undergo person verification immediately before the person takes the seat, which is usually carried out subsequent to face verification at the entrance. Even when the person undergoes person verification at this stage, the person verification would fail due to the loss of person information in the seat occupancy database.

In the present embodiment, the seat occupancy management server 5 re-performs the person verification operation by using an image captured by an in-room camera 3 (omnidirectional camera) to address this issue. Specifically, the alert indication 58 is popped up on the seating position confirmation screen displayed on the user terminal 8 of the person seated in the seat. the seat occupancy management server 5 may be configured to determine, among the persons in the office, a person whose seating position is not identified, and cause the user terminal 8 carried by the unidentified person to display the alert indication 58.

In the example shown in FIG. 8, the seating position confirmation screen includes an unidentified person icon 55 at the position of the seat where a seated person is unidentified, and the unidentified person icon 55 is highlighted by blinking or any other visual effect.

Then, the seat occupancy management server 5 transmits a notification to the user terminal 8 in order to prompt the user to register the seating position by doing face verification again. For example, when the user operates an OK button in an alert indication 58, the seat occupancy management server 5 causes the user terminal 8 to display a guidance screen to notify that the user should turn the user's face to one of the in-room cameras 3 located near the user. When the user turns the face to an in-room camera 3 according to the guidance, the in-room camera 3 captures an image of the user's face. Then, the seat occupancy management server 5 acquires face feature data of the person from an image captured by the in-room camera 3 and performs (re-performs) the face verification operation to identify the person seated in the seat.

In some cases, a person icon for a user in the screen displayed on the user terminal 8 may be blinked as a message to prompt the user to register the user's seating position by doing face verification again. The seat occupancy management server 5 may be configured to identify a user terminal 8 carried by a person whose seating position is unidentified based on the position data of the seat on which the person is seated, and transmit a notification to the user terminal 8 in order to prompt the user to register the seating position. The seat occupancy management server 5 may use an output device such as a monitor, a light, or a speaker installed near the seat where an unidentified person is seated in order to provide a notification to prompt the person to register the seating position.

Figure 9:
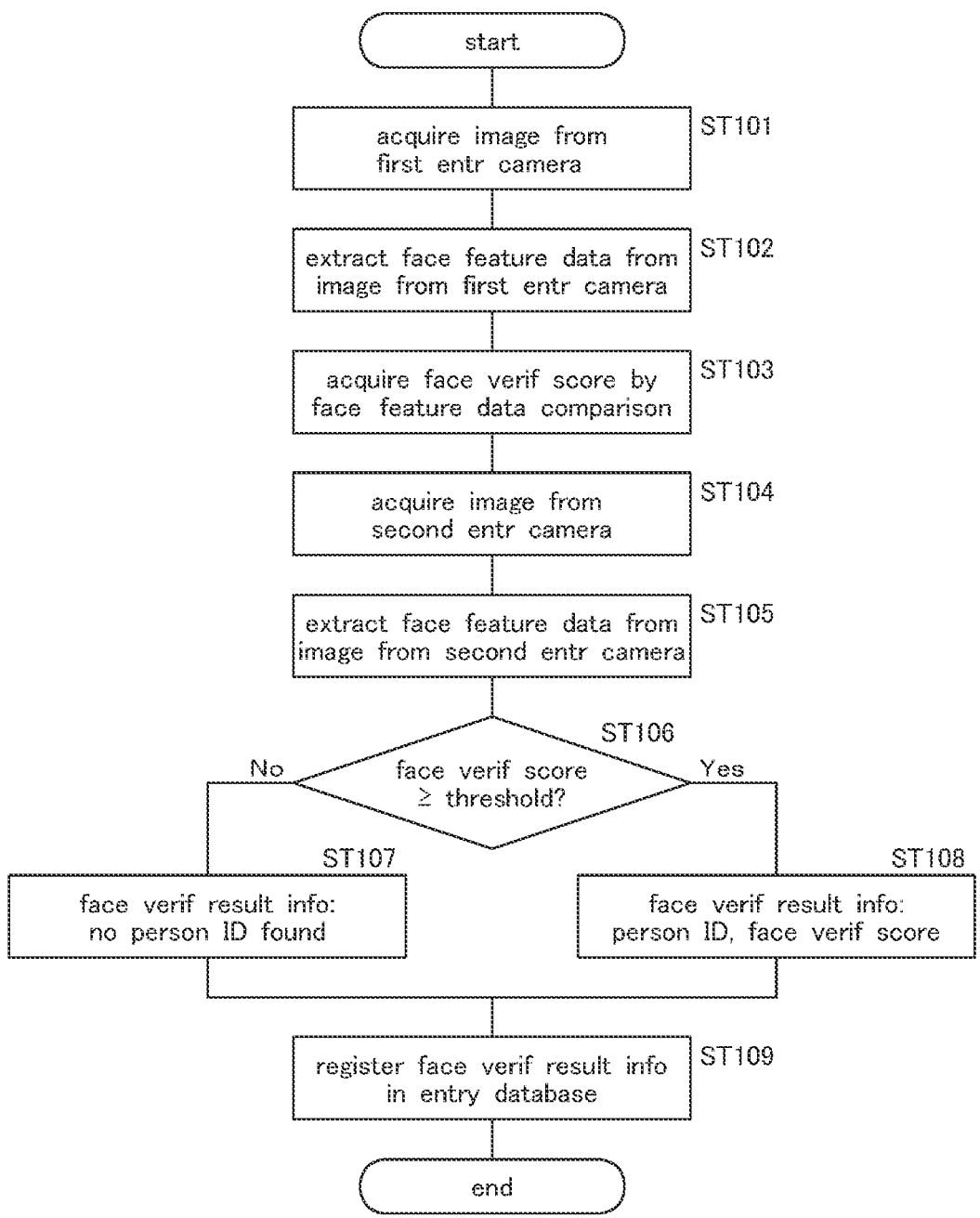
FIG. 9 is a flow chart showing a procedure of a face verification operation and a person detection operation performed by the entry management server 4.

Next, a face verification operation and a person detection operation performed by the entry management server 4 will be described. FIG. 9 is a flow chart showing a procedure of the face verification operation and the person detection operation performed by the entry management server 4.

In the entry management server 4, first, the processing controller 23 acquires a captured image received from the first entrance camera 1 through the communication device 21 (ST101). Next, the processing controller 23 extracts face feature data of an entering person who is entering the office, from the image captured by the first entrance camera 1 (ST102). Then, the processing controller 23 acquires face feature data for each registered person from the storage device 22, and compares the face feature data of each registered person with the face feature data of the entering person to acquire a face verification score. (ST103).

Next, the processing controller 23 acquires a captured image received from the second entrance camera 2 through the communication device 21 (ST104). Specifically, the processing controller 23 acquires the image captured by the second entrance camera 2 at the same time as or immediately after the image from the first entrance camera 1 is captured. Next, the processing controller 23 extracts person feature data of the entering person from the image captured by the second entrance camera 2 (ST105).

Next, the processing controller 23 determines whether or not the face verification score is equal to or greater than a predetermined threshold value (face verification score determination operation) (ST106).

When the face verification score is equal to or greater than the threshold value; that is, when the face verification is successful (Yes in ST106), the processing controller 23 identifies the entering person who is entering the office and generates face verification result information including the person ID and the face verification score (ST108). When the face verification score is less than the threshold value; that is, when the face verification fails (No in ST106), the processing controller 23 determines that the person is not registered and generates face verification result information without any person ID (ST107).

Next, the processing controller 23 transmits the face verification result information and the person feature data to the database server 6, and registers them in the entry database (ST109).

Figure 10:
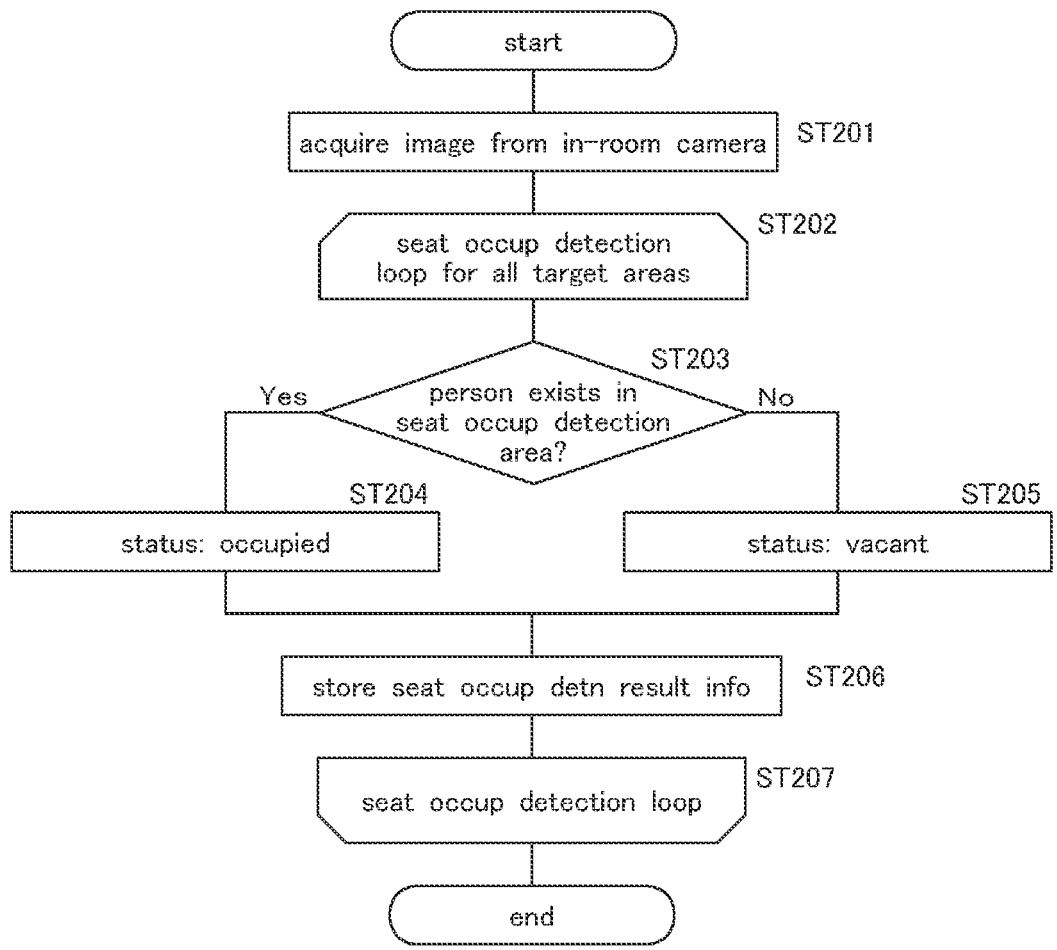
FIG. 10 is a flow chart showing a procedure of a seat occupancy detection operation performed by the seat occupancy management server 5.

Next, a seat occupancy detection operation performed by the seat occupancy management server 5 will be described. FIG. 10 is a flow chart showing a procedure of the seat occupancy detection operation performed by the seat occupancy management server 5.

In the seat occupancy management server 5, the processing controller 43 first acquires an image captured by each in-room camera 3 (ST201). Then, the processing controller 43 repeats the seat occupancy detection operation (performs a seat occupancy detection loop) for all the seat occupancy detection areas (ST202 to ST207).

In the seat occupancy detection operation, the processing controller 43 first detects a person in an image of a seat occupancy detection area in an image captured by an in-room camera 3, and determines whether or not a person is present in the seat occupancy detection area (ST203).

When a person is present in the seat occupancy detection area (Yes in ST203), the processing controller 43 determines the occupancy status of the seat occupancy detection area to be occupied (ST204). When there is no person in the seat occupancy detection area (No in ST203), the processing controller 43 determines the occupancy status of the seat occupancy detection area to be vacant (ST205). Then, the processing controller 43 stores the seat occupancy detection result information and the detailed seat occupancy detection result information in the storage device 42 (ST206).

Figure 11:
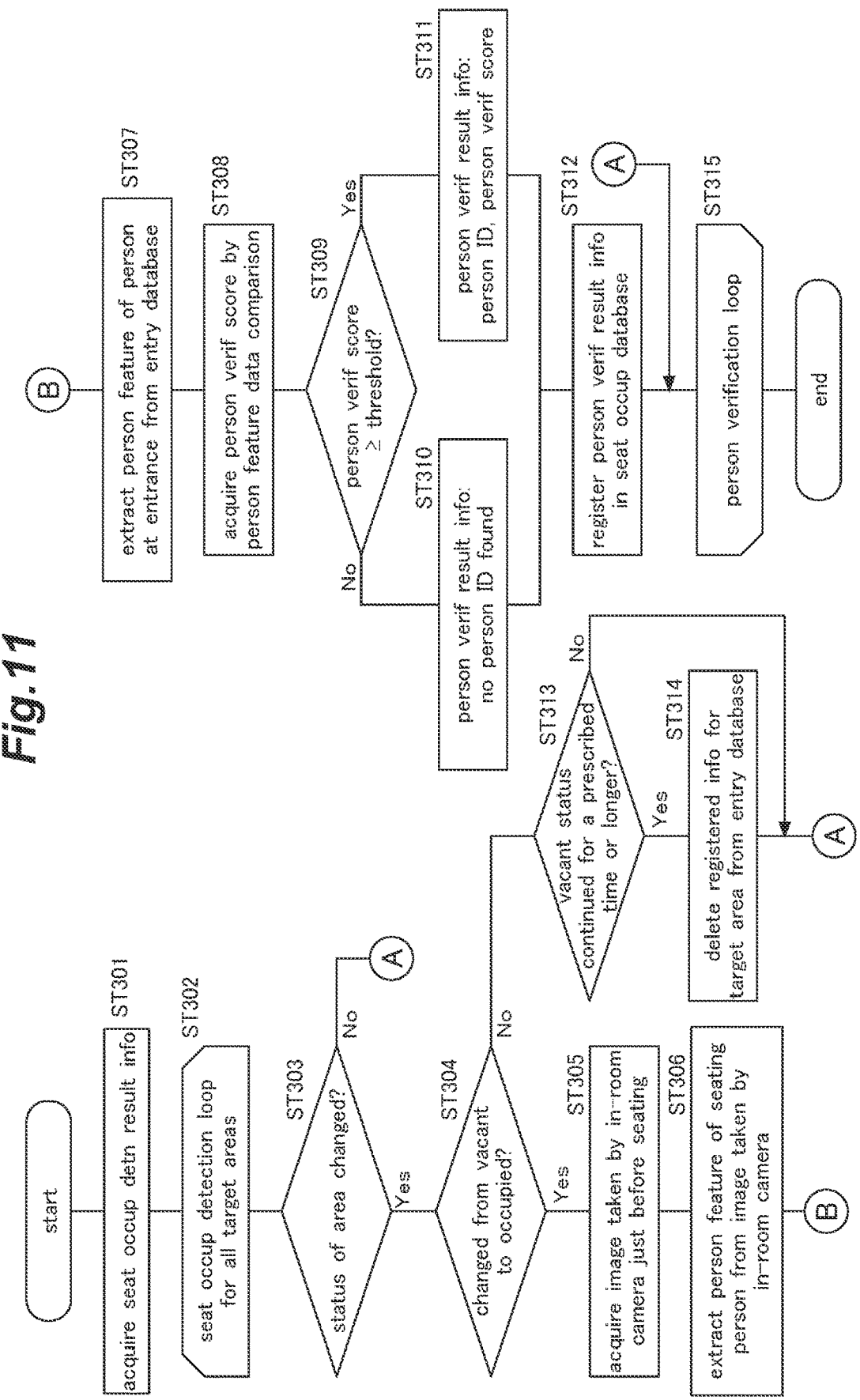
FIG. 11 is a flow diagram showing a procedure of a person verification operation performed on the seat occupancy management server 5.

Next, a person verification operation performed on the seat occupancy management server 5 will be described. FIG. 11 is a flow diagram showing a procedure of the person verification operation performed on the seat occupancy management server 5.

In the seat occupancy management server 5, the processing controller 43 first acquires seat occupancy detection result information from the storage device 42 (ST301). Then, the processing controller 43 repeats the person verification operation (performs a person verification loop) for all the seat occupancy detection areas (ST302 to ST315).

In the person verification operation, the processing controller 43 first determines whether or not that the occupancy status of each seat occupancy detection area has changed (ST303).

When the occupancy status of a seat occupancy detection area has changed (Yes in ST303), the processing controller 43 determines whether or not the occupancy status of the seat occupancy detection area has changed from occupied to vacant (ST304).

When the occupancy status of the seat occupancy detection area has changed from vacant to occupied; that is, when a person is seated (Yes in ST304), the processing controller 43 acquires an image captured by an in-room camera 3 immediately before the person takes the seat, from the storage device 42 (ST305). Then, the processing controller 43 extracts person feature data of the person immediately before taking the seat from the image captured by the in-room camera 3 (ST306).

Next, the processing controller 43 acquires registered person feature data of each entered person who is registered in the entry database in the database server 6 (ST307). Then, the processing controller 43 compares the person feature data of the person immediately before taking the seat with the registered person feature data of the entered person, to thereby acquire a person verification store (ST308).

Next, the processing controller 43 determines whether or not the person verification score is equal to or greater than a predetermined threshold value (person verification score determination operation) (ST309).

When the person verification score is equal to or greater than the threshold value; that is, when the person verification is successful (Yes in ST309), the processing controller 43 identifies the person who is taking the seat and generates person verification result information including the person ID and the person verification score (ST311). When the person verification score is less than the threshold value; that is, when the person verification fails (No in ST309), the processing controller 43 determines that the person is not registered and generates person verification result information without any person ID (ST307). Then, the processing controller 43 transmits the person verification result information to the database server 6 and registers it in the seat occupancy database (ST312).

It should be noted that, when the person verification is successful and the information on the person is registered in the seat occupancy database, the information on the person is deleted from the entry database.

When the occupancy status of the seat occupancy detection area has changed from occupied to vacant (No in ST304), the processing controller 43 determines whether or not the occupancy status of vacant has continued for a predetermined time or longer (ST313). When determining that the occupancy status of vacant has continued for the predetermined time or longer (Yes in ST313), the processing controller 43 determines that the person has left the seat, and the processing controller 43 deletes registered information on this seat occupancy detection area from the seat occupancy database in the database server 6 (ST314).

Figure 12:
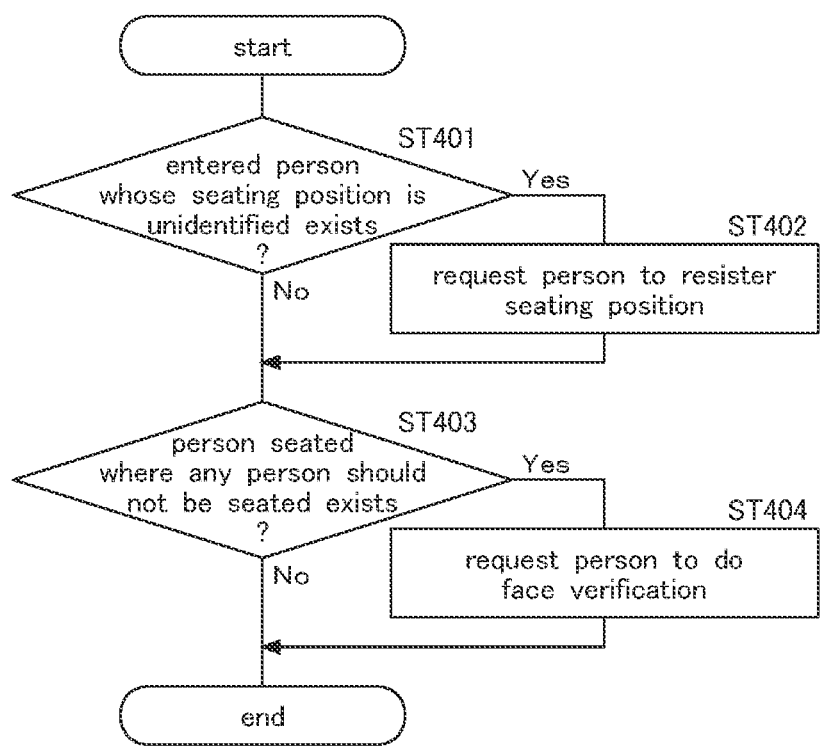
FIG. 12 is a flow chart showing a procedure of a seating position verification operation performed by the seat occupancy management server 5.

Next, a seating position verification operation performed by the seat occupancy management server 5 will be described. FIG. 12 is a flow chart showing a procedure of the seating position verification operation performed by the seat occupancy management server 5.

In the seating position verification operation, the processing controller 43 determines whether or not there is an entered person who has entered the office and whose seating position is unidentified based on registered information in the entry database and the seat occupancy database (ST401).

When there is an entered person whose seating position is unidentified (Yes in ST401), the processing controller 43 requests the person to register the person's seating position (ST402). For example, the processing controller 43 transmits an e-mail to a user terminal 8 to prompt a corresponding user to register the seating position by operating the terminal, and causes the user terminal 8 to display the seating position confirmation screen (see FIG. 7) on which the user can enter the user's person information.

Furthermore, the processing controller 43 determines whether or not there is a person seated on a seat (seat occupancy detection area) where the person should not be seated, based on registered information records in the seat occupancy database and the detailed seat occupancy detection result information.

When there is a person who is seated on a seat where the person should not be seated, the processing controller 43 requests the person to do face verification (ST404). Specifically, the processing controller 43 causes the user terminal 8 to display an alert indication 58 in the seating position confirmation screen (see FIG. 8), thereby prompting the person to register the seating position by doing face verification again.

(Variant of First Embodiment)

Figure 13:
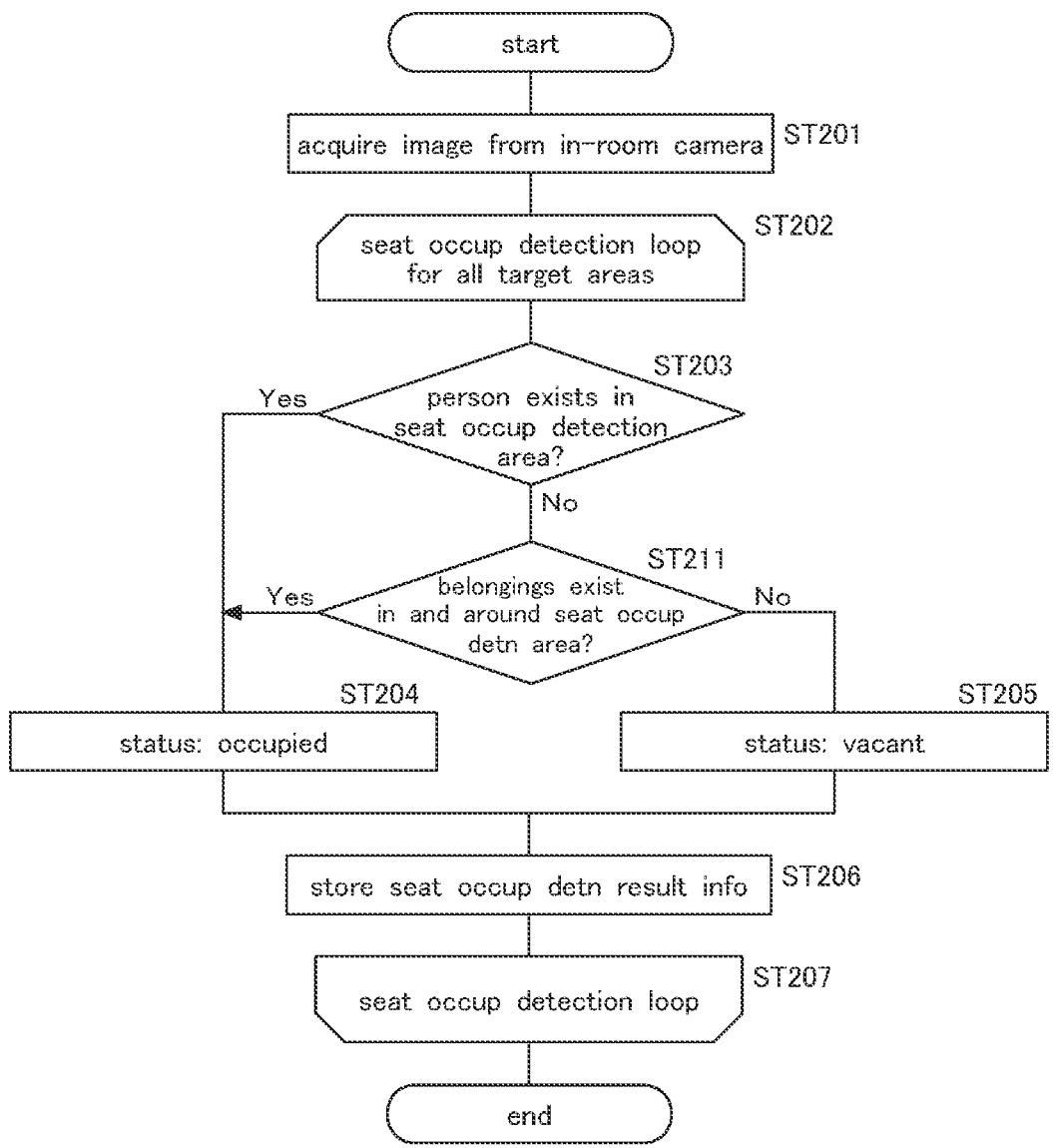
FIG. 13 is a flow chart showing a procedure of a seating position detection operation performed by the seat occupancy management server 5 according to a variant of the first embodiment.

Next, a variant of the first embodiment of the present invention will be described. Except for what will be discussed here, this embodiment is the same as the above-described first embodiment. FIG. 13 is a flow chart showing a procedure of a seating position detection operation performed by the seat occupancy management server 5 according to the variant of the first embodiment.

In the first embodiment (see FIG. 10), when a person is present in a target seat occupancy detection area, the processing controller 43 of the seat occupancy management server 5 determines the occupancy status of the seat occupancy detection area to be occupied, and when a person is not present in a target seat occupancy detection area, the processing controller 43 determines the occupancy status of the seat occupancy detection area to be vacant.

In the variant of the first embodiment, even in the case where a person is not seated on a seat, when there are belongings of a person located in and around the seat, the processing controller 43 determines the occupancy status of the seat occupancy detection area to be occupied. Thus, even in the case where a user temporarily leaves a seat for some reason (e.g., for a meeting with another person in the office), when there are belongings of the user located in and around the seat, the occupancy status of the user's seat is not changed to vacant (a vacant seat).

Specifically, when acquiring an image captured by an in-room camera 3 (ST201), the processing controller 43 starts the seat occupancy detection operation for all the seat occupancy detection areas (ST202). Then, the processing controller 43 performs the person detection operation on a seat occupancy detection area in the image captured by the in-room camera 3 and determines whether or not a person is present in the target seat occupancy detection area (ST203).

When a person is present in the seat occupancy detection area (Yes in ST203), the processing controller 43 determines the occupancy status of the seat occupancy detection area to be occupied (ST204). When there is no person in the seat occupancy detection area (No in ST203), the processing controller 43 determines the occupancy status of the seat occupancy detection area to be vacant (ST211).

When there are belongings of a person located in and around the seat occupancy detection area (Yes in ST211), the processing controller 43 determines the occupancy status of the seat occupancy detection area to be occupied (ST204). When there are not belongings of a person located in and around the seat occupancy detection area (No in ST211), the processing controller 43 determines the occupancy status of the seat occupancy detection area to be vacant (ST205). Subsequently, the processing controller 43 performs the same operations as the first embodiment (see FIG. 7).

It should be noted that belongings of a user may include a bag, a personal computers (PC) and other things that the user has brought into the office, and are placed on the desk at the seat. As each seat occupancy detection area is set at and around a seat, a belongings detection area may be set so as to surround a seat, in particular, surround the desk for a seat and the processing controller 43 may determine if there are belongings of a user in each belongings detection area.

In the above-described variant of the first embodiment, when there are only belongings of a person and the person is not present, the processing controller 43 determines the occupancy status of a seat occupancy detection area to be occupied. In other cases, the processing controller 43 determines the occupancy status of a seat occupancy detection area to be a third occupancy status such as temporary vacant (a person icon 52 remains). In this case, different colors of a frame of each person icon 52, different marks added to each person icon 52 or other visual features may be used to distinguishably indicate the two different occupancy statuses (i.e., occupied and temporary vacant) of each seat.

Second Embodiment

Figure 14:
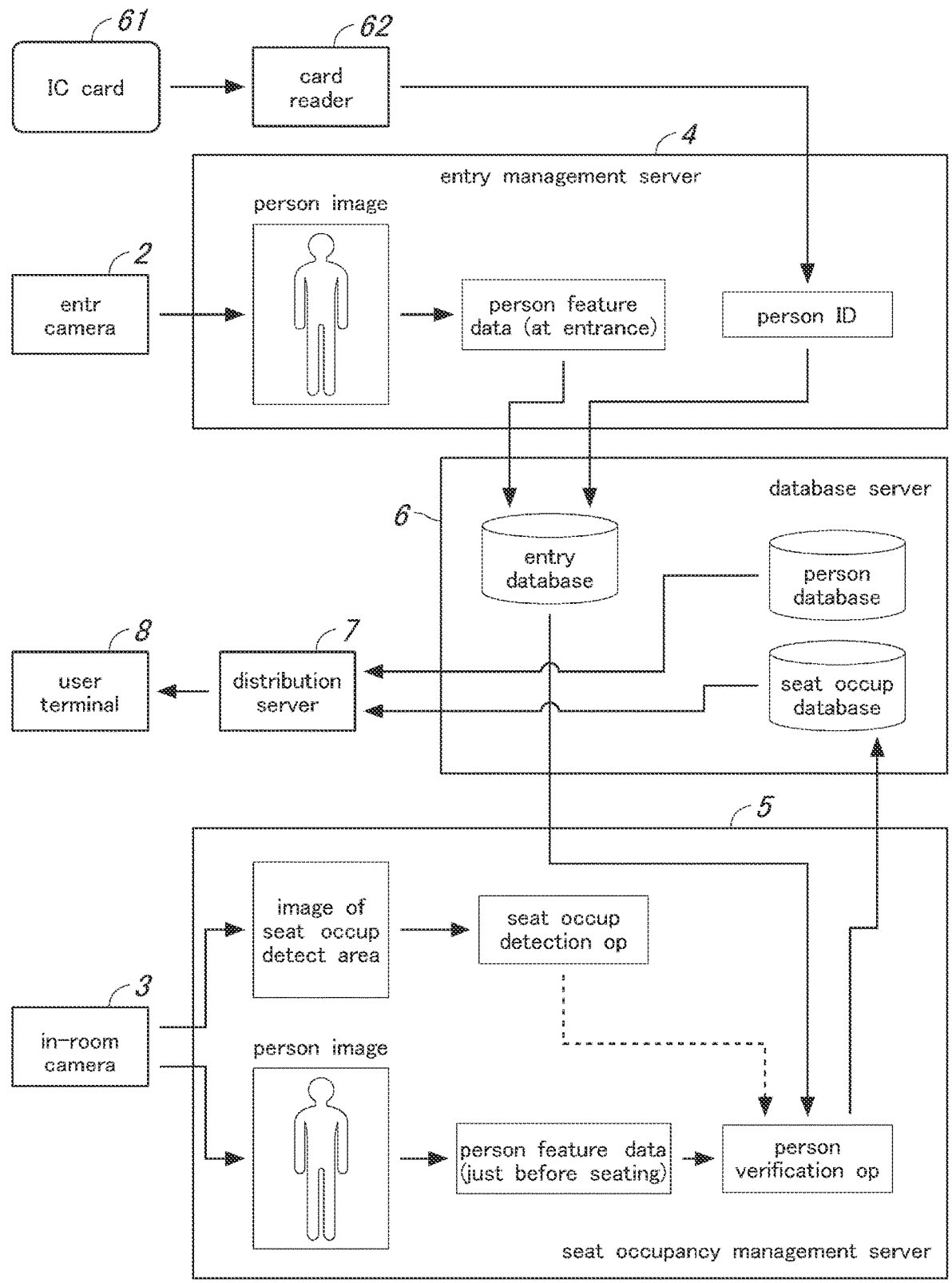
FIG. 14 is an explanatory diagram showing an outline of processing operations performed by a seating position management system according to a second embodiment of the present invention.

Next, a second embodiment of the present invention will be described. Except for what will be discussed here, this embodiment is the same as the above-described embodiments. FIG. 14 is an explanatory diagram showing an outline of processing operations performed by a seating position management system according to the second embodiment of the present invention.

In the first embodiment (see FIG. 3), a person who is entering the office undergoes face authentication (face verification) in the person identification operation performed by the entry management server 4 at the entrance. In the second embodiment, a person who is entering the office undergoes card authentication in the person identification operation performed at the entrance.

Specifically, when entering the office, a user needs to pass an IC card 61 carried by the user, over a card reader 62 to be authenticated. The entry management server 4 acquires the person ID of the user who is entering the office through the card authentication.

In the second embodiment, an entering person undergoes card authentication in the person identification operation. However, in other embodiments, person authentication in the person identification operation is not limited to card authentication. Other types of person authentication may include authentication using RFID (radio frequency identifier) or NFC (Near field communication), smartphone authentication using a two-dimensional code for authentication displayed on the smartphone, and biometrics authentication using a fingerprint or any other biometric data.

Specific embodiments of the present disclosure are described herein for illustrative purposes. However, the present disclosure is not limited to those specific embodiments, and various changes, substitutions, additions, and omissions may be made for features of the embodiments without departing from the scope of the invention. In addition, elements and features of the different embodiments may be combined with each other to yield an embodiment which is within the scope of the present disclosure.

INDUSTRIAL APPLICABILITY

A seating position management system and a seating position management method according to the present invention achieve an effect of allowing for inexpensive and accurate identification of the seating position of each user in a free address office without incurring additional equipment costs, and are useful as a seating position management system and a seating position management method for identifying a seating position of a user in an office area.

Glossary 1 first entrance camera
2 second entrance camera
3 in-room camera (in-area camera)
4 entry management server
5 seat occupancy management server
6 database server
7 distribution server
8 user terminal (user device)
21 communication device
22 storage device
23 processing controller
31 communication device
32 storage device
33 processing controller
41 communication device
42 storage device
43 processing controller
51 layout plan
52 person icon
53 balloon
55 person icon
56 balloon
58 alert indication
61 IC card
62 card reader

The invention claimed is:

1. A seating position management system for identifying a seating position of a user in an office area, the system comprising:
an entrance camera for capturing images of an area in and around an entrance to the office area;
an in-area camera for capturing images of an area within the office area; and
a controller processor configured to:
identify a user who has entered the office area by performing a person identification operation on an entering person who is entering the office area; and
identify the seating position of the user in the office area by performing a person verification operation based on a first person image acquired from an image captured by the entrance camera and a second person image acquired from an image captured by the in-area camera, wherein the person verification operation compares the first person image with the second person image for matching the first person image with the second person image, to thereby associate an entered person who has entered the office area with a seated person who is seated in the office area, and when the person identification operation shows that there is a user who has entered the office area, but whose seating position has not been identified by a seating-position identifying operation, the processing controller performs a seating position verification operation for determining the user's seating position, causing a seating position confirmation screen to be displayed on a user device.

2. The seating position management system according to claim 1, wherein the processing controller performs the person identification operation through face verification by comparing a face image of the entering person acquired from an image captured by the entrance camera with the face image of each registered user for matching the face image of the entering person with the face image of a registered user.

3. The seating position management system according to claim 1, wherein the processing controller performs the person verification operation when detecting that a user takes a seat in the office area, using the second person image captured before the detection.

4. The seating position management system according to claim 1, wherein the processing controller performs the person verification operation by comparing feature data extracted from the first person image with feature data extracted from the second person image for matching the first person image with the second person image.

5. The seating position management system according to claim 1, wherein the processing controller determines whether the occupancy status of a seat in a seat occupancy detection area is occupied or vacant based on the image captured by the in-area camera, and determines whether a user takes a seat or leaves the seat based on a result of the detection of the occupancy status of the seat.

6. The seating position management system according to claim 1, wherein, when there is an entered person who has entered the office area and whose seating position has not been identified, the processing controller causes the seating position confirmation screen to be displayed on the user device carried by the entered person and to display a notification to prompt the entered person to register their seating position.

7. The seating position management system according to claim 1, wherein, when there is a seated person on a seat which should be a vacant seat, the processing controller causes the seating position confirmation screen to be displayed on the user device carried by the seated person and to display a notification to prompt the seated person to participate in face verification using a camera located to capture an image of the seated person.

8. The seating position management system according to claim 1, wherein the processing controller
generates a screen overlaying a mark image indicating the seating position for a user on an area map indicating a layout plan of the office area, and
displays the generated screen on a user device carried by the user.

9. The seating position management system according to claim 1, wherein the processing controller detects belongings of a user located in and around a seat occupancy detection area and determines whether a seat in the seat occupancy detection area is occupied or vacant based on a detection result.

10. A seating position management method for identifying a seating position of a user in an office area, comprising:
identifying with a processing controller a user who has entered the office area by capturing the user's image with an entrance camera and performing a person identification operation on an entering person who is entering the office area using the user's image captured by the entrance camera;
identifying with the processing controller the seating position of the user in the office area by performing a person verification operation based on a first person image acquired from the user's image captured by the entrance camera and a second person image acquired from an image captured by an in-area camera, wherein the person verification operation includes comparing the first person image with the second person image for matching the first person image with the second person image to thereby associate an entered person who has entered the office area with a seated person who is seated in the office area;
performing a seating position verification operation for determining the user's seating position when the person identification operation shows that there is a user who has entered the office area, but whose seating position has not been identified by a seating-position identifying operation; and
displaying a seating position confirmation screen on a user device in response to performing the seating position verification operation.

* * * * *